US011950077B2

(12) United States Patent
Hu et al.

(10) Patent No.: US 11,950,077 B2
(45) Date of Patent: Apr. 2, 2024

(54) SPEAKER

(71) Applicant: AAC Microtech (Changzhou) Co., Ltd., Changzhou (CN)

(72) Inventors: Hongjian Hu, Shenzhen (CN); Shuai Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 173 days.

(21) Appl. No.: 17/744,754

(22) Filed: May 16, 2022

(65) Prior Publication Data

US 2023/0239627 A1 Jul. 27, 2023

(30) Foreign Application Priority Data

Jan. 26, 2022 (CN) ......................... 202210093000.5

(51) Int. Cl.

| | |
|---|---|
| ***H04R 9/06*** | (2006.01) |
| ***H04R 7/12*** | (2006.01) |
| ***H04R 7/18*** | (2006.01) |
| ***H04R 9/02*** | (2006.01) |

(52) U.S. Cl.

CPC ................. *H04R 9/06* (2013.01); *H04R 7/12* (2013.01); *H04R 7/18* (2013.01); *H04R 9/025* (2013.01); *H04R 2400/11* (2013.01)

(58) Field of Classification Search

None

See application file for complete search history.

(56) References Cited

U.S. PATENT DOCUMENTS

| | | | | |
|---|---|---|---|---|
| 2020/0213715 | A1* | 7/2020 | Cao ........................ | H04R 9/025 |
| 2022/0337940 | A1* | 10/2022 | Qin ...................... | H04R 1/2857 |

FOREIGN PATENT DOCUMENTS

| | | | |
|---|---|---|---|
| CN | 107801133 A | * | 3/2018 |

* cited by examiner

*Primary Examiner* — James K Mooney

(74) *Attorney, Agent, or Firm* — W&G Law Group

(57) ABSTRACT

A speaker includes a frame with a leakage hole, a magnetic circuit system and a vibration system received in the frame and a mesh covering the leakage hole. The vibration system comprises a diaphragm and a coil. The magnetic circuit system comprises a lower clamp and a magnet assembly stacked on the lower clamp. The mesh is integrally injection-molded with the frame, and comprises a central portion opposite to the leakage hole and a fixed portion located around the central portion and fixed with the frame. The fixed portion comprises an embedded portion embedded in the frame. The frame comprises a cover portion covering the embedded portion. The cover portion is provided with a recessed portion recessed from the surface of the cover portion away from the embedded portion toward the embedded portion until in contact with the embedded portion.

10 Claims, 10 Drawing Sheets

A--A

SPEAKER

TECHNICAL FIELD

The present disclosure relates to electroacoustic transducers, in particular to a speaker.

BACKGROUND

With the rapid development of mobile communication technology in recent years, consumers are increasingly using mobile communication devices with voice functions, such as portable phones, handheld game consoles, laptops, multimedia players and other devices that can communicate through public or private communication networks. Speaker, as a voice playback device, directly affects the performance of mobile communication devices.

In the related art, the speaker includes a vibration system, a magnetic circuit system drives the vibration system to vibrate and produce sound, and a frame receives the vibration system and the magnetic circuit system. The internal space of the speaker is divided into a front sound cavity and a rear sound cavity with the diaphragm of the vibration system as the boundary, and the frame of the speaker is provided with a leakage hole to communicate the rear sound cavity of the speaker and an external space of the speaker, and the speaker is provided with a mesh covering the leakage hole and integrally molded with the frame.

However, in the related art, the light and soft mesh can only be attached to the surface of the frame through the integral injection molding process, causing that the bonding force between the mesh and the frame is poor. This is because the surface of the frame where the leakage hole is set is usually flat, as shown in FIGS. 1(*a*) and 1(*b*), in the injection molding of the frame, the inner surface of the mold cavity 60' at the position corresponding to the surface of the frame where the leakage hole is set is also flat, when the mesh 50' is put into the mold cavity 60' and the fluid material 70' for manufacturing the frame is introduced into the mold cavity 60', the mesh 50' is pushed by the fluid material 70' to fit the inner surface of the mold cavity 60'. And when the fluid material 70' is cured, that is the frame is molded in the mold cavity 60', the mesh 50' is attached to the outer surface of the frame.

Therefore, it is necessary to provide an improved speaker to solve the above problems.

SUMMARY

An objective of the present disclosure is to provide a speaker with better reliability and without increasing manufacturing difficulty.

In order to achieve the objective mentioned above, the present disclosure provides a speaker comprising: a frame with a leakage hole; a magnetic circuit system and a vibration system received in the frame, the vibration system comprising a diaphragm and a coil driving the diaphragm to vibrate and produce sound; the magnetic circuit system comprising a lower clamp and a magnet assembly stacked on the lower clamp; a mesh covering the leakage hole and integrally injection-molded with the frame, the mesh comprising a central portion opposite to the leakage hole and a fixed portion located around the central portion and fixed with the frame. The diaphragm, the frame and the magnetic circuit system enclose a rear acoustic cavity of the speaker, the leakage hole communicates with the rear acoustic cavity and an external space of the speaker. The fixed portion comprises an embedded portion embedded in the frame. The frame comprises a cover portion covering the embedded portion. The cover portion is provided with a recessed portion recessed from the surface of the cover portion toward the embedded portion and in contact with the embedded portion.

As an improvement, the cover portion comprises a plurality of the recessed portions, the plurality of the recessed portions are spaced apart.

As an improvement, the recessed portion has an arched surface, and the embedded portion is tangent to the arched surface of the recessed portion.

As an improvement, the fixed portion further comprises an exposed portion adhered to the surface of the frame.

As an improvement, the leakage hole is a rectangular hole, the cover portion is located at one side of the leakage hole, and the exposed portion is located at the other three sides of the leakage hole.

As an improvement, the frame comprises a main frame and two side plates extending from the main frame, the diaphragm is fixed to the main frame, the leakage hole is arranged on the side plates.

As an improvement, the cover portion is provided on a side of the side plate close to the rear acoustic cavity, the recessed portion is recessed from a surface of the side plate facing the rear acoustic cavity in a direction away from the rear acoustic cavity.

As an improvement, each of the side plates is provided with two leakage holes and one mesh covering the two leakage holes.

As an improvement, the embedded portion bends from the edge of the exposed portion and extends in a direction away from the rear acoustic cavity.

As an improvement, the speaker further comprises a front cover covering the frame, the vibration system is sandwiched between the front cover and the frame, the magnetic circuit system is located on a side of the vibration system away from the front cover.

BRIEF DESCRIPTION OF DRAWINGS

In order to more clearly illustrate the technical solutions in the embodiments of the present disclosure, the following is a brief description of the accompanying drawings that need to be used in the description of the embodiments. It is clear that the following drawings are only some embodiments of the present disclosure, and for those of ordinary skill in the art, other drawings can also be obtained from these drawings without any creative effort, wherein.

DESCRIPTION OF EMBODIMENTS

The technical solutions in the embodiments of the present disclosure will be clearly and completely described below with reference to the accompanying drawings in the embodiments of the present disclosure, and it is clear that the described embodiments are only a part of the embodiments of the present disclosure, and not all of them. Based on the embodiments of the present disclosure, all other embodiments obtained by those of ordinary skill in the art without creative efforts shall fall within the protection scope of the present disclosure.

Figure 1:
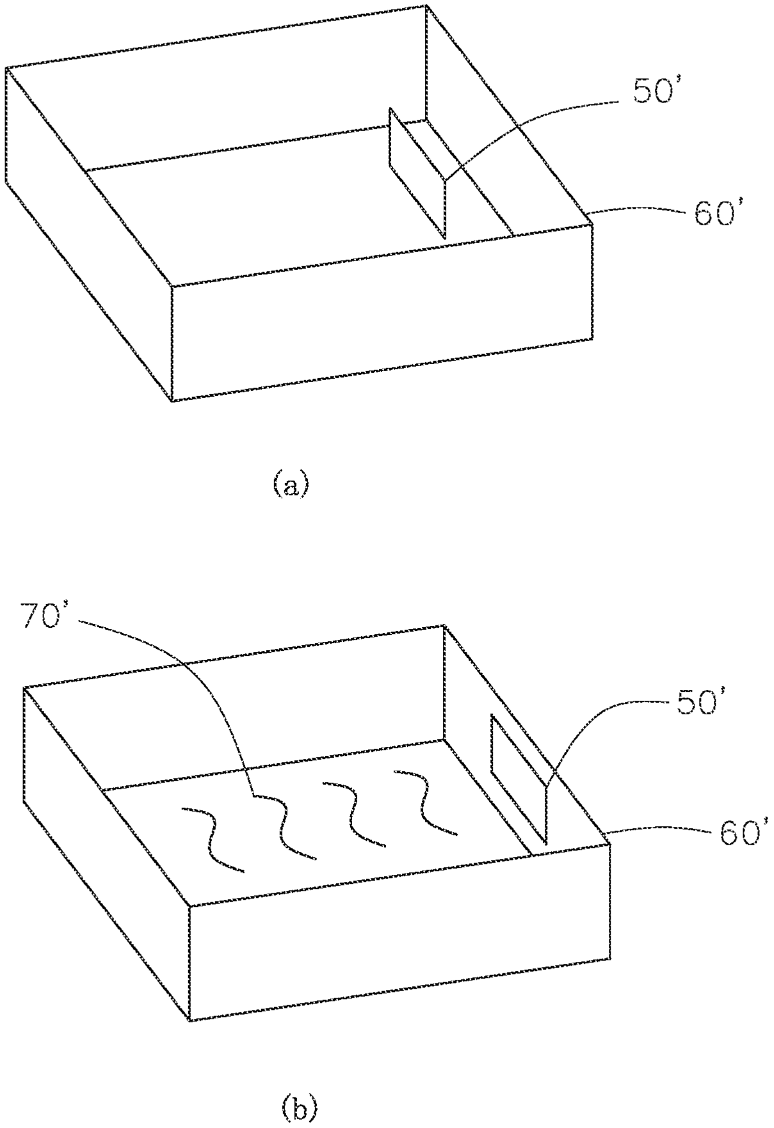
FIG. 1 is a schematic view of manufacturing a frame in accordance with a prior art, where (a) is a schematic view of the scene the mesh just being put into the mold cavity, and (b) is a schematic view of the scene the mesh being pushed by the fluid material after being put into the mold cavity.
Figure 2:
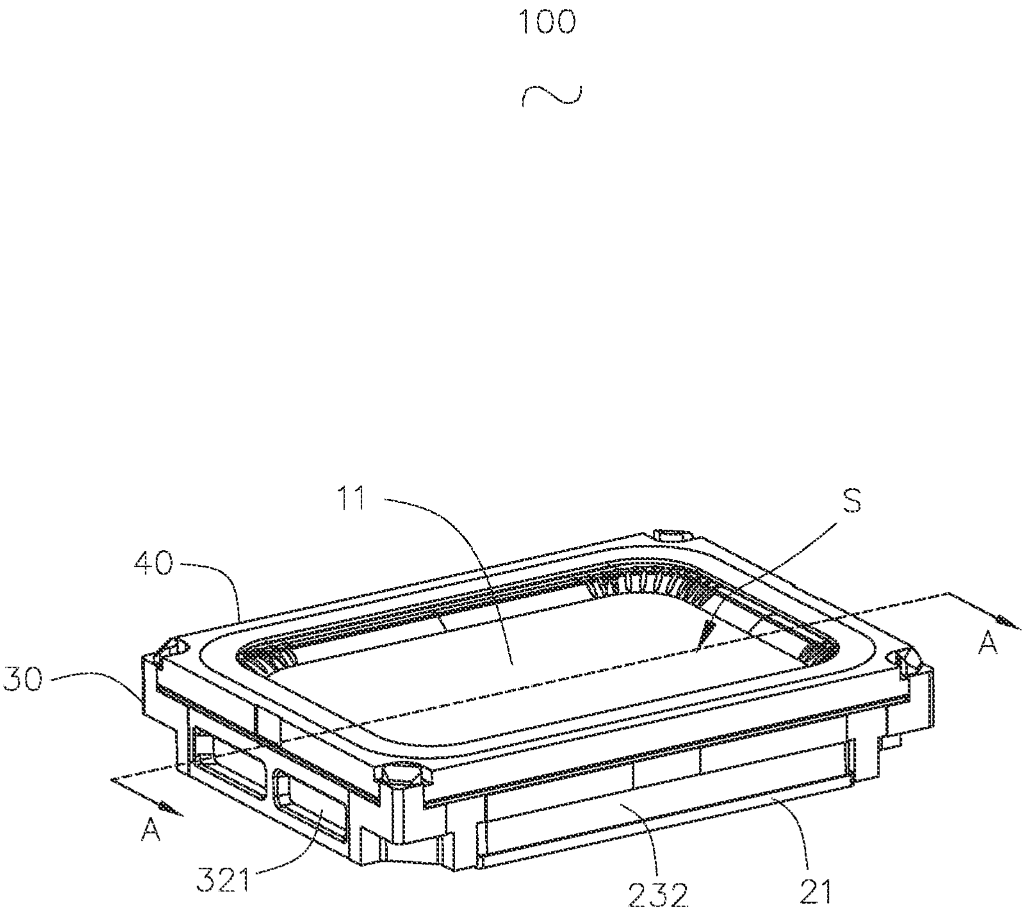
FIG. 2 is an isometric view of a speaker in accordance with an exemplary embodiment of the present disclosure.
Figure 3:
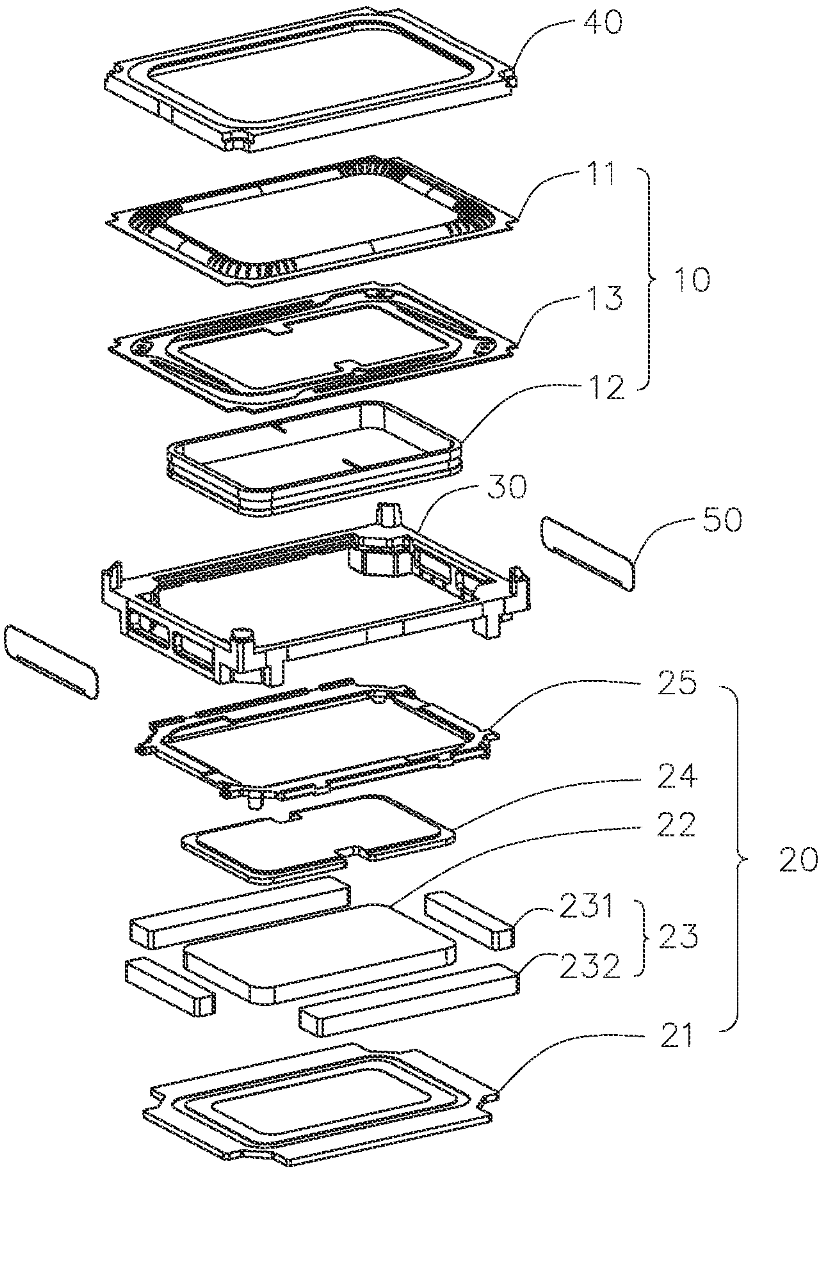
FIG. 3 is an exploded view of the speaker in FIG. 2.
Figure 4:
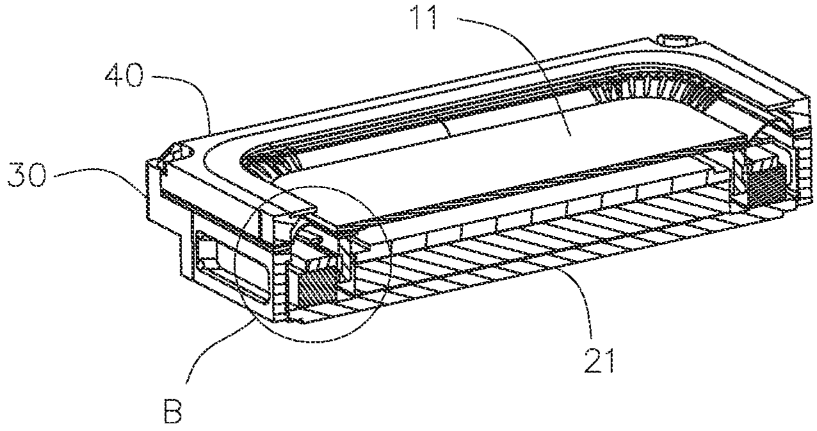
FIG. 4 is an isometric view of the speaker taken along line A-A in FIG. 2.
Figure 5:
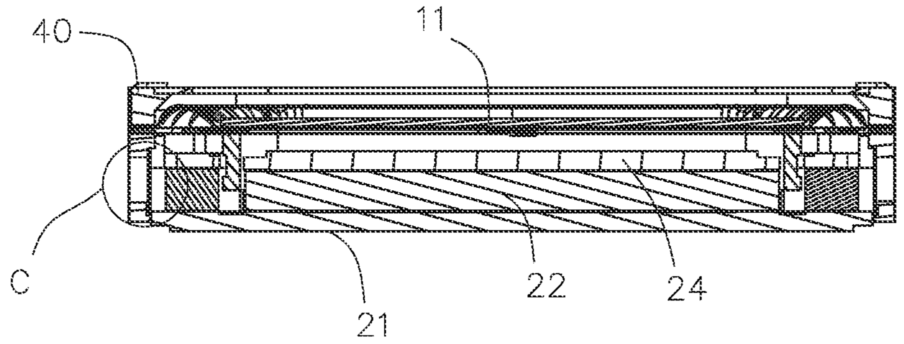
FIG. 5 is a cross-sectional view of the speaker taken along line A-A in FIG. 2.
Figure 6:
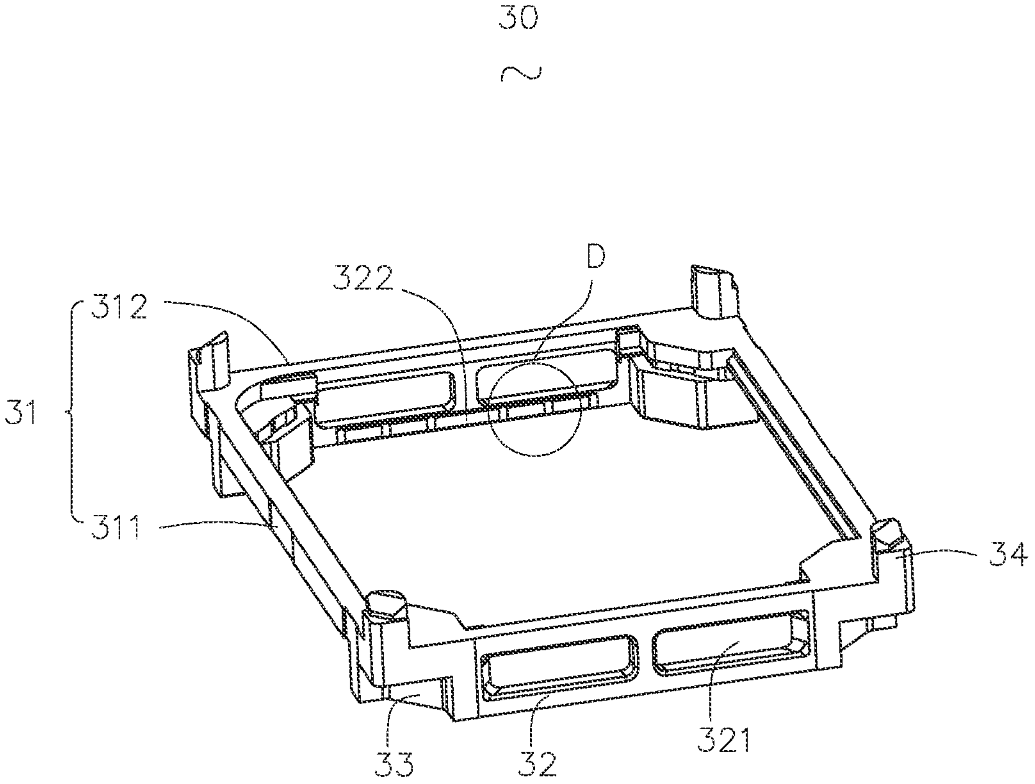
FIG. 6 is an isometric view of a frame of the speaker in FIG. 2.
Figure 7:
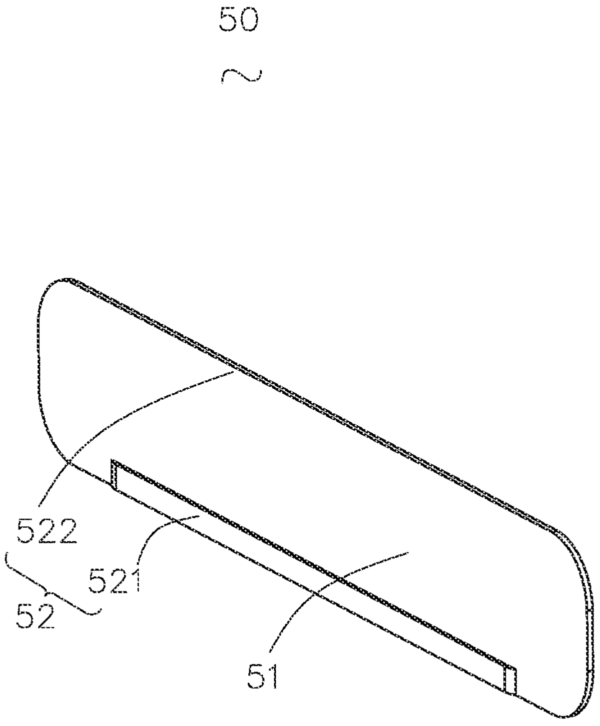
FIG. 7 is an isometric view of a mesh of the speaker in FIG. 2.
Figure 8:
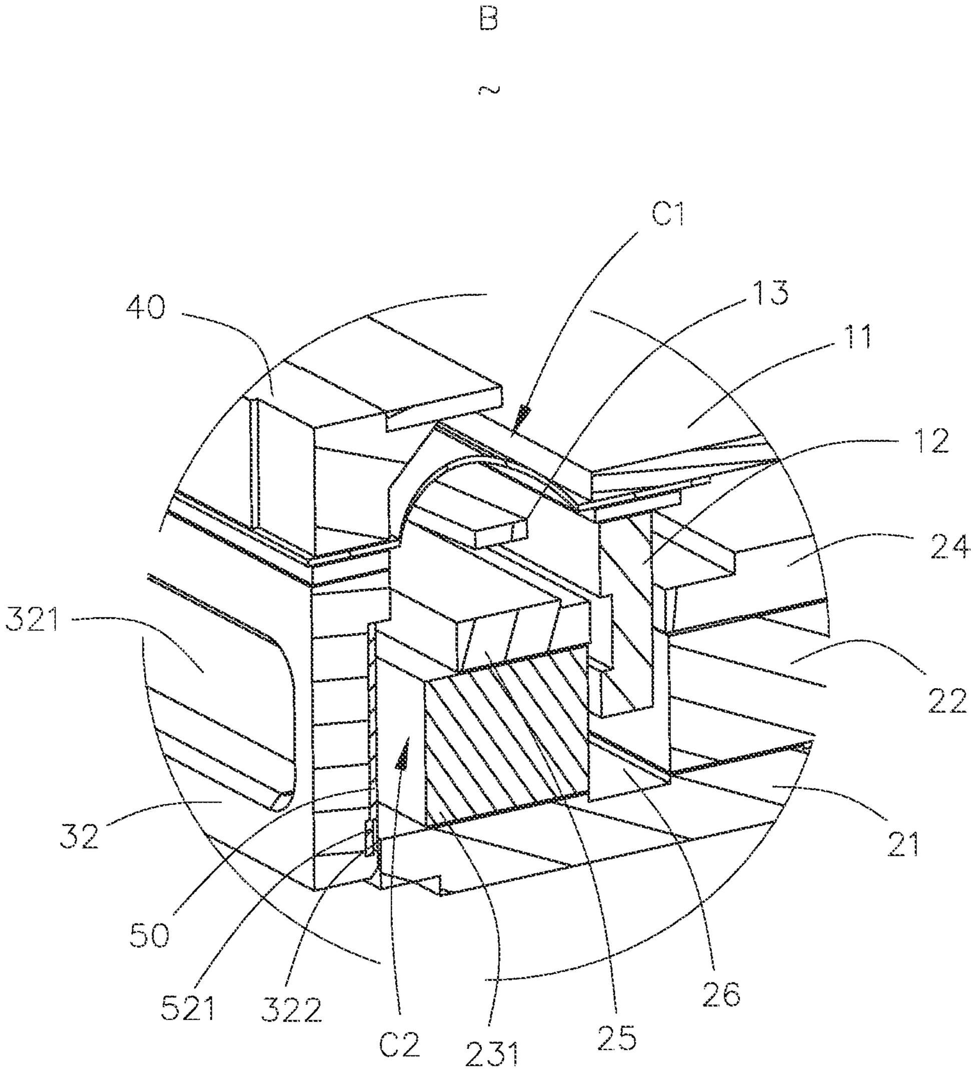
FIG. 8 is a partially enlarged view of B in FIG. 4.
Figure 9:
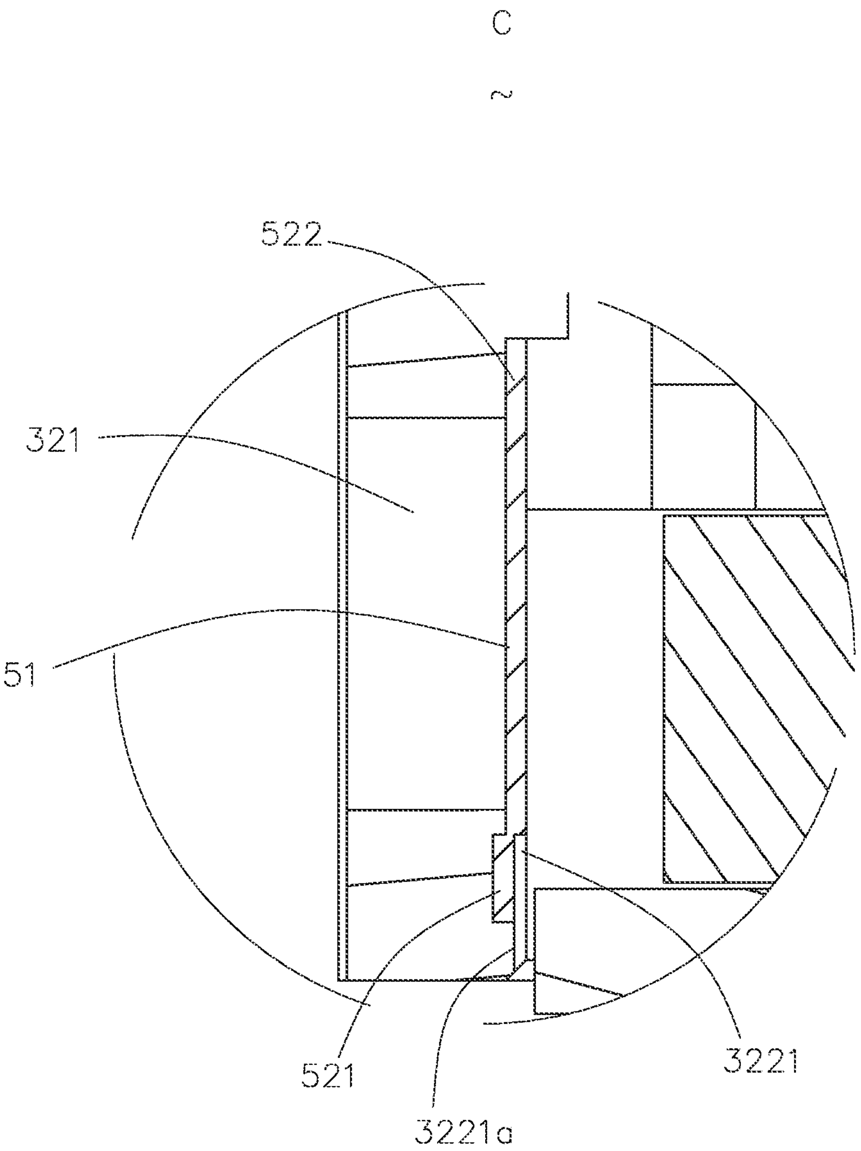
FIG. 9 is a partially enlarged view of C in FIG. 5.
Figure 10:
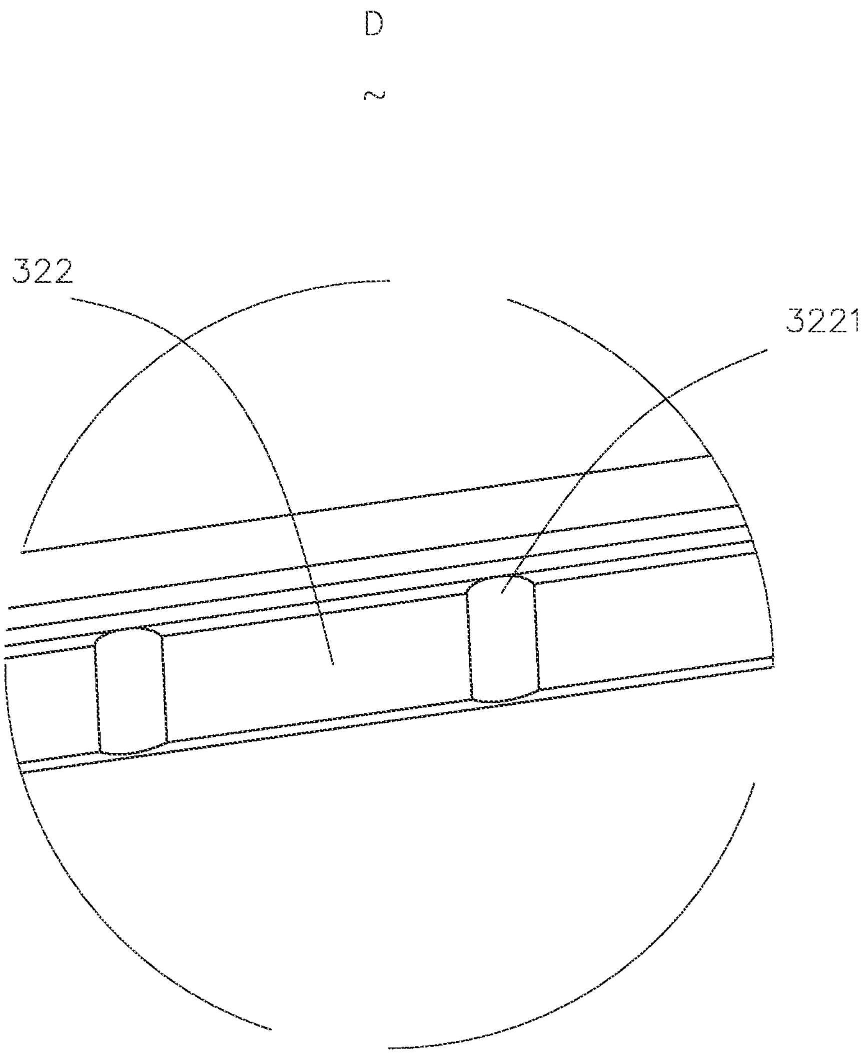
FIG. 10 is a partially enlarged view of D in FIG. 6.

As shown in FIGS. 2-3, the present disclosure provides a speaker 100 comprising a vibration system 10, a magnetic circuit system 20, a frame 30 receiving the vibration system 10 and the magnetic circuit system 20 and a front cover 40 covering the frame 30. And the front cover 40 is provided with a sound outlet S.

As shown in FIGS. 2-5, 8, the vibration system 10 comprises a diaphragm 11 for vibrating and sounding, a coil 12 for driving the diaphragm 11 to vibrate and sound, and an elastic sheet 13 for supporting the vibration of the diaphragm 11 and the coil 12 and providing restoring force. The elastic sheet 13 is flat and sandwiched between the diaphragm 11 and the coil 12.

As shown in FIGS. 2-5, 8, the magnetic circuit system 20 is used to drive the vibration system 10 to vibrate and produce sound, the magnetic circuit system 20 comprises a lower clamp 21 and a magnet assembly. The magnet assembly comprises a main magnetic steel 22 disposed on the lower clamp 21, a secondary magnetic steel 23 arranged on the lower clamp 21 and around the main magnetic steel 22, a pole core 24 disposed on the side of the main magnetic steel 22 away from the lower clamp 21 and an upper clamp 25 disposed on the side of the secondary magnetic steel 23 away from the lower clamp 21. Wherein, the secondary magnetic steel 23 comprises first secondary magnetic steels 231 located at two opposite sides of the main magnetic steel 22 and second secondary magnetic steels 232 located at the other two sides of the main magnetic steel 22. A magnetic gap 26 is formed between the main magnetic steel 22 and the secondary magnetic steel 23.

As shown in FIGS. 2-6, the frame 30 comprises a substantially rectangular main frame 31, which includes two opposite long side frames 311 and two opposite short side frames 312. The frame 30 further includes two side plates 32 extending from the two short side frames 312, each of the two side plates 32 extending from one side surface of a short side frames 312. The frame 30 further includes support columns 33 extending from the four corners of the frame 30 in the same direction with the side plates 32, and positioning columns 34 extending from the four corners of the frame 30 in the opposite directions to the supporting columns 33. Each side plate 32 is connected to two adjacent supporting columns 33, and the positioning columns 34 are positioned in cooperation with the four corners of the front cover 40.

As shown in FIGS. 2-8, the vibration system 10 and the magnetic circuit system 20 are assembled in the receiving space formed by the frame 30 and the front cover 40. Specifically, the vibration system 10 is sandwiched between the frame 30 and the front cover 40, and the magnetic circuit system 20 is assembled on the side of the vibration system 10 away from the front cover 40. After assembly, the first secondary magnetic steel 231 is arranged in parallel with the short side frame 312, and the second secondary magnetic steel 232 is arranged in parallel with the long side frame 311, wherein, each first secondary magnetic steel 231 is located on the inner side of a side plate 32 and spaced from the side plate 32, and each second secondary magnetic steel 232 is located between the two support columns 33 and faced and connected to the long side frame 311, the lower clamp 21 is fixed with the side plate 32 and the end of the support column 33 away from the main frame 31, and the upper clamp 25 is fixed with the main frame 31. After assembly, a front acoustic cavity C1 is formed between the diaphragm 11 and the front cover 40, and a rear acoustic cavity C2 is formed between the diaphragm 11, the magnetic circuit system 20 and the frame 30.

As shown in FIGS. 2-10, the side plate 32 of the frame 30 is provided with a leakage hole 321 to communicating the rear acoustic cavity C2 with the external space of the speaker 100. The speaker 100 further includes a mesh 50 covering the leakage hole 321 and integrally injection-molded with the side plate 32. The mesh 50 is a lightweight mesh. The mesh 50 includes a central portion 51 opposite to the leakage hole 321 and a fixed portion 52 located at the periphery of the central portion 51 and connected to the side plate 32. A part of the fixed portion 52 is embedded in the side plate 32 to form an embedded portion 521, another part of the fixed portion 52 is adhered to the surface of the side plate 32 to form an exposed portion 522, the part of the side plate 32 covering the embedded part 521 is formed as a cover portion 322, the cover portion 322 is provided with a recessed portion 3221, which is recessed from the surface of the cover portion 322 toward the embedded portion 521 until it touches the embedded portion 521, that is, the portion 3221*a* of the recessed portion 3221 farthest from the surface of the cover portion 322 is in contact with the embedded portion 521.

In this embodiment, the surface of the recessed portion 3221 is an arched surface, and the arched surface is tangent to the embedded portion 521, but this disclosure does not limit the specific shape of the recessed portion 3221.

In this embodiment, the cover portion 322 is disposed on the side of the side plate 32 close to the rear acoustic cavity C2, and the recessed portion 3221 is recessed from the surface of the side plate 32 facing the rear acoustic cavity C2 in the direction away from the rear acoustic cavity C2, but in other embodiments of the present disclosure, the cover portion 322 can also be disposed on the side of the side plate 32 away from the rear acoustic cavity C2, and the recessed portion 3221 is recessed from the surface of the side plate 32 away from the rear acoustic cavity C2 in the direction close to the rear acoustic cavity C2.

In this embodiment, the leakage hole 321 is substantially rectangular, but the present disclosure does not limit the specific shape of the leakage hole 321.

In this embodiment, two leakage holes 321 are provided on each side plate 32, but this disclosure does not limit that each side plate 32 is provided with leakage holes 321, as long as at least one side plate 32 is provided with a leakage hole 321. In addition, the present disclosure also does not limit the number of the leakage holes 321 provided on each side plate 32.

In this embodiment, each side plate 32 is provided with a mesh 50, and the mesh 50 covers two leakage holes 321, but this disclosure does not limit that each side plate 32 is provided with only one mesh 50, the number of meshes 50 can be the same as the number of leakage holes 321 and each mesh 50 only covers one leakage hole 321.

In this embodiment, the cover portion 322 and the embedded portion 521 are arranged next to one long side of the leakage hole 321, and the exposed portion 522 is arranged next to the other three sides of the leakage hole 321, but this disclosure does not limit the specific positions and size of the cover portion 322 and the embedded portion 521, as long as the fixed portion 52 is at least partially embedded into the cover portion 322 to form the embedded portion 521, that is, it is also possible to have the fixed portion 52 fully embedded in the cover portion 322 without an exposed portion 522.

In this embodiment, the embedded portion 521 bends from the edge of the exposed portion 522 and extends in a direction away from the rear acoustic cavity C2, but this disclosure does not limit the embedded portion 521 and the exposed portion 522 to be staggered in the thickness direction of the mesh 50. In other embodiments, the embedded portion 521 and the exposed portion 522 can be in the form of a flush plate.

In the present application, the recessed portion 3221 is provided, the inner surface of the mold cavity is correspondingly provided with a protruding structure. When injecting the frame 30, the mesh 50 will contact the protruding structure away from the inner surface of the mold cavity after be pushed by the fluid material, instead of fitting the inner surface of the mold cavity as a whole, so that the fluid material will flow between the mesh 50 and the inner surface of the mold cavity and solidify to form the cover portion 322, as a result, the embedded part 521 of the mesh 50 is embedded in the cover portion 322, which improves the bonding force between the mesh 50 and the frame 30. Meanwhile, this disclosure only changes the structural design of the frame 30 and does not increase the manufacturing difficulty.

The above described are merely some embodiments of the present disclosure, it should be pointed out that for those of ordinary skill in the art, improvements can be made without departing from the inventive concept of the present disclosure, shall fall within the protection scope of the present disclosure.

What is claimed is:

1. A speaker, comprising:

a frame with a leakage hole;

a magnetic circuit system and a vibration system received in the frame, the vibration system comprising a diaphragm and a coil driving the diaphragm to vibrate and produce sound; the magnetic circuit system comprising a lower clamp and a magnet assembly stacked on the lower clamp;

a mesh covering the leakage hole and integrally injection-molded with the frame, the mesh comprising a central portion opposite to the leakage hole and a fixed portion located around the central portion and fixed with the frame;

wherein, the diaphragm, the frame and the magnetic circuit system enclose a rear acoustic cavity of the speaker, the leakage hole communicates with the rear acoustic cavity and an external space of the speaker, the fixed portion comprises an embedded portion embedded in the frame; the frame comprises a cover portion covering the embedded portion; the cover portion is provided with a recessed portion recessed from the surface of the cover portion toward the embedded portion and in contact with the embedded portion toward the embedded portion and in contact with the embedded portion.

2. The speaker as described in claim 1, wherein the cover portion comprises a plurality of the recessed portions, the plurality of the recessed portions are spaced apart.

3. The speaker as described in claim 1, wherein the recessed portion has an arched surface, and the embedded portion is tangent to the arched surface of the recessed portion.

4. The speaker as described in claim 1, wherein the fixed portion further comprises an exposed portion adhered to the surface of the frame.

5. The speaker as described in claim 4, wherein the leakage hole is a rectangular hole, the cover portion is located at one side of the leakage hole, and the exposed portion is located at the other three sides of the leakage hole.

6. The speaker as described in claim 4, wherein the frame comprises a main frame and two side plates extending from the main frame, the diaphragm is fixed to the main frame, the leakage hole is arranged on the side plates.

7. The speaker as described in claim 6, wherein the cover portion is provided on a side of each side plate close to the rear acoustic cavity, the recessed portion is recessed from a surface of each side plate facing the rear acoustic cavity in a direction away from the rear acoustic cavity.

8. The speaker as described in claim 7, wherein the embedded portion bends from the edge of the exposed portion and extends in a direction away from the rear acoustic cavity.

9. The speaker as described in claim 6, wherein each of the side plates is provided with two leakage holes and one mesh covering the two leakage holes.

10. The speaker as described in claim 1, wherein the speaker further comprises a front cover covering the frame, the vibration system is sandwiched between the front cover and the frame, the magnetic circuit system is located on a side of the vibration system away from the front cover.

* * * * *